(12) United States Patent
Aga et al.

(10) Patent No.: US 12,119,151 B2
(45) Date of Patent: Oct. 15, 2024

(54) FERRITE POWDER AND METHOD OF PRODUCING THE SAME

(71) Applicant: POWDERTECH CO., LTD., Kashiwa (JP)

(72) Inventors: Koji Aga, Kashiwa (JP); Takashi Kojima, Kashiwa (JP); Takao Sugiura, Kashiwa (JP); Sho Kuwahara, Kashiwa (JP); Satomi Konno, Kashiwa (JP); Tadashi Tsuduki, Kashiwa (JP)

(73) Assignee: POWDERTECH CO., LTD., Kashiwa (JP)

( * ) Notice: Subject to any disclaimer, the term of this patent is extended or adjusted under 35 U.S.C. 154(b) by 0 days.

(21) Appl. No.: 17/795,382

(22) PCT Filed: Jan. 27, 2021

(86) PCT No.: PCT/JP2021/002835
§ 371 (c)(1),
(2) Date: Jul. 26, 2022

(87) PCT Pub. No.: WO2021/153612
PCT Pub. Date: Aug. 5, 2021

(65) Prior Publication Data
US 2023/0085745 A1    Mar. 23, 2023

(30) Foreign Application Priority Data
Jan. 27, 2020  (JP) .................................. 2020-010745

(51) Int. Cl.
*H01F 1/34* (2006.01)
*C01G 49/00* (2006.01)

(52) U.S. Cl.
CPC ......... *H01F 1/344* (2013.01); *C01G 49/0072* (2013.01); *C01P 2002/50* (2013.01); *C01P 2004/32* (2013.01); *C01P 2004/61* (2013.01); *C01P 2006/40* (2013.01); *C01P 2006/42* (2013.01); *C01P 2006/80* (2013.01)

(58) Field of Classification Search
None
See application file for complete search history.

(56) References Cited

U.S. PATENT DOCUMENTS

| | | | |
|---|---|---|---|
| 2011/0244272 A1* | 10/2011 | Suzuki | C04B 35/6262 252/62.55 |
| 2015/0277256 A1* | 10/2015 | Sawamoto | H01F 1/01 428/402 |
| 2017/0301443 A1* | 10/2017 | Aga | C09D 7/70 |
| 2018/0009677 A1* | 1/2018 | Aga | H01F 1/348 |
| 2018/0179082 A1 | 6/2018 | Aga et al. | |
| 2019/0013043 A1* | 1/2019 | Nakashio | G11B 5/714 |
| 2019/0161362 A1* | 5/2019 | Kojima | C08K 7/18 |
| 2019/0300379 A1 | 10/2019 | Kojima et al. | |
| 2020/0143966 A1 | 5/2020 | Ishii et al. | |
| 2021/0047200 A1 | 2/2021 | Aga et al. | |

FOREIGN PATENT DOCUMENTS

| | | |
|---|---|---|
| JP | H05036515 A | 2/1993 |
| JP | 2005015303 A1 | 1/2005 |
| JP | 2015190995 A | 11/2015 |
| JP | 2016060682 A | 4/2016 |
| JP | 2017178718 A | 10/2017 |
| WO | 2017169316 A1 | 10/2017 |
| WO | 2017212997 A1 | 12/2017 |
| WO | 2018182021 A1 | 10/2018 |
| WO | 2019159797 A1 | 8/2019 |
| WO | 2019159799 A1 | 8/2019 |

OTHER PUBLICATIONS

English translation of Ito et al. JP 2017/098482 (Year: 2017).*
International Search Report for International Application No. PCT/JP2021/002835; Date of Mailing, Apr. 13, 2021.
CNIPA Notice of First Examination Opinion for corresponding CN Application No. 202180010387.7; Mailing Date, Aug. 12, 2023.

* cited by examiner

*Primary Examiner* — Ronak C Patel
(74) *Attorney, Agent, or Firm* — CANTOR COLBURN LLP

(57) ABSTRACT

Provided are a ferrite powder capable of maintaining a high withstand voltage even when used in a resin composition having high magnetic properties and electrical resistivity and a high filling ratio, and a method for producing the same. A ferrite powder composed of spherical ferrite particles, wherein the ferrite powder contains iron (Fe): 55.0-70.0 mass % and manganese (Mn): 3.5-18.5 mass %, the ferrite powder containing more than 0.0 mass % to 7.5 mass % $\alpha\text{-Fe}_2\text{O}_3$, and the ferrite powder has a volume average particle size (D50) of 15.0 μm or less.

10 Claims, No Drawings

FERRITE POWDER AND METHOD OF PRODUCING THE SAME

CROSS REFERENCE TO RELATED APPLICATIONS

This is the U.S. national stage of application No. PCT/JP2021/002835, filed on Jan. 27, 2021. Priority under 35 U.S.C. § 119(a) and 35 U.S.C. § 365(b) is claimed from Japanese Application No. 2020-010745, filed Jan. 27, 2020, the disclosure of which is also incorporated herein by reference.

TECHNICAL FIELD

The present invention relates to a ferrite powder and a method for producing the ferrite powder.

BACKGROUND ART

Ferrite resin composite materials (or ferrite resin compositions) composed of ferrite powder and resins have been widely used in various applications, including electromagnetic shielding materials. Such composite materials are produced by kneading of ferrite powder as fillers with resins and are shaped into various shaped articles (or composite articles) with different shapes such as sheets. In the formation of the shaped articles, the particles, which constitute the ferrite powder, close to a spherical shape have higher flowability in a shaping process and higher filling ratio in the composite articles. Accordingly, such particles contribute to good formability and superior characteristics such as electromagnetic shielding properties. From this point of view, ferrite powder composed of spherical particles has been attracted and a process of producing such spherical particles by a thermal spraying process has been proposed.

For example, Patent Document 1 (PCT International Publication No. WO2017/212997) discloses substantially Zn-free monocrystalline ferrite particles having a mean particle size of 1 to 2,000 nm with a highly spherical shape and containing 3 to 25 wt % Mn and 43 to 65 wt % Fe. This patent also discloses that the shaped article composed of such ferrite particles and binder resins exhibits a maximum value of the real part of the complex magnetic permeability ($\mu'$) in a frequency band of 100 MHz to 1 GHz (see claim 1 in Patent Document 1). This patent further discloses that the granular product composed of raw ferrite material is ferritized by a thermal spraying process in the ambient air, followed by rapidly cooling and solidification, that particles within a predetermined range of particle size are then collected and used to produce a shaped article, and that the use of such a shaped article in the electromagnetic shielding material for electronic devices can lead to effective and stable electromagnetic shielding properties, regardless of frequency, in a broad frequency band required for the shielding (see paragraphs [0039] and [0078] in Patent Document 1).

Patent Document 2 (PCT International Publication No. WO2017/169316) discloses Mn-based monocrystalline ferrite particles having a mean particle size of 1 to 2,000 nm with a highly spherical shape and exhibiting a saturation magnetization of 45 to 95 $Am^2/kg$ (see claim 1 in patent Document 2). This patent also discloses that the ferrite raw material containing Mn and Fe is ferritized by a thermal spraying process in the ambient air, followed by rapid cooling and solidification, that particles within a predetermined range of particle size are then collected and used to produce a shaped article, and that the use of such a shaped article can lead to higher saturation magnetization and have higher dispersibility in resins, solvents or resin compositions (see paragraphs [0033] and [0089] in Patent Document 2).

Patent Document 3 (Japanese Unexamined Patent Application, Publication No. 2016-060682) discloses a highly spherical ferrite powder including 15 to 30 wt % ferrite particles with a particle size of less than 11 μm and having a volume average particle size of 10 to 50 μm, which powder is ferritized by a thermal spraying process after producing the adjusted granular product from the powder. This patent also discloses that the ferrite powder exhibits high filling ability, high formability, superior handling ability, and high electrical resistivity in the use as fillers, and that these advantages allow the shaped articles made from the resin composition composed of such spherical ferrite powder and resins to be employed in various applications including IC sealants for electromagnetic wave absorption (see claim 1, and paragraphs [0058] and [0093] in Patent Document 3).

Patent Document 4 (Japanese Unexamined Patent Application, Publication No. 2005-015303) discloses a process of producing a spherical powder, comprising the steps of: heating a mixture of a raw powder and a processing agent including at least one selected from the group consisting of higher fatty acids or their derivatives, higher hydrocarbons, and higher alcohols to a predetermined temperature to treat the surfaces of the raw powder by stirring the mixture; melting the surface-treated raw powder by supplying it into a combustible flame generated by a burner to make a spherical melted powder: and further solidifying the melted powder by moving it outside of the combustible flame to produce a spherical powder (see claim 1 in Patent Document 4).

Patent Document 1: PCT International Publication No. WO2017/212997
Patent Document 2: PCT International Publication No. WO2017/169316
Patent Document 3: Japanese Unexamined Patent Application, Publication No. 2016-060682
Patent Document 4: Japanese Unexamined Patent Application, Publication No. 2005-015303

DISCLOSURE OF THE INVENTION

Problems to be Solved by the Invention

Unfortunately, the present inventors have found that ferrite powder produced from spherical particles prepared by the thermal spraying process has low electrical resistivity and may cause problems in terms of a withstand voltage (or a breakdown voltage) when kneaded with resin to form a resin composition. In particular, the withstand voltage of the resin composition decreases in the case of high filling ratio of ferrite powder in the resin composition. A lower withstand voltage of the resin composition causes dielectric breakdown on the application of voltage, generating problems for devices.

The present inventors have also found through further studies that inclusion of a predetermined amount of α-$Fe_2O_3$ in the ferrite powder composed of spherical particles can increase the electrical resistivity while maintaining the magnetic properties (e.g., saturation magnetization or magnetic permeability) of the ferrite powder, and a higher withstand voltage can be kept even in higher filling ratio when such ferrite powder is used in the resin composition.

The present invention has been completed based on these findings. An object of the invention is to provide a ferrite powder which can have superior magnetic properties and high electrical resistivity and maintain high withstand voltage even when used in a resin composition in a high filling ratio, and a process for producing such ferrite powder.

Means for Solving the Problems

The present invention encompasses the following Aspects (1) to (7). In the present specification, the expression "- to -" includes the numerical values at both ends thereof. In other words, the term "X to Y" is synonymous with "X or more to Y or less".

Aspect (1): A ferrite powder comprising highly spherical ferrite particles,
wherein the ferrite powder contains 55.0 to 70.0 mass % iron (Fe) and 3.5 to 18.5 mass % manganese (Mn), the ferrite powder containing more than 0.0 mass % to 7.5 mass % $\alpha$-$Fe_2O_3$, and
wherein the ferrite powder has a volume average particle size (D50) of 15.0 µm or less.

Aspect (2): The ferrite powder according to Aspect (1), wherein the $\alpha$-$Fe_2O_3$ is contained in the ferrite powder in an amount of 3.0 mass % to 6.0 mass %.

Aspect (3): The ferrite powder according to Aspect (1) or (2), wherein the ferrite powder has a volume average particle size (D50) of 2.0 µm or more.

Aspect (4): The ferrite powder according to any one of Aspects (1) to (3), wherein the ferrite powder has a mean shape factor SF-1 of 100 to 110.

Aspect (5): The ferrite powder according to any one of Aspects (1) to (4), wherein the ferrite powder has a carbon (C) content of 0.12 mass % or less.

Aspect (6): The ferrite powder according to any one of Aspects (1) to (5), wherein the ferrite powder has a volume resistivity of $1.0 \times 10^8$ Ω·cm or more.

Aspect (7): A process for producing the ferrite powder according to any of Aspects (1) to (6), comprising the steps of:
mixing raw materials for ferrite to prepare a raw material mixture;
calcining the raw material mixture to form a calcined product;
pulverizing and granulating the calcined product to prepare a granular product; and
thermally spraying the granular product to produce a thermally sprayed product;
wherein the granular product has a carbon content of 0.001 to 0.095 mass %, and the feed rate of a raw material is 2.5 to 9.0 kg/hour, the flow rate of combustible gas is 3 to 10 m³/hour, and the flow rate of oxygen is 18 to 60 m³/hour in the step of thermally spraying.

Effects of the Invention

The present invention provides a ferrite powder having superior magnetic properties and high electrical resistivity that can maintain high withstand voltage even when used in a resin composition in a high filling ratio, and a process for producing the ferrite powder.

PREFERRED MODE FOR CARRYING OUT THE INVENTION

Specific embodiments of the present invention (hereinafter referred to as "the present embodiment") will now be described. The present invention should not be limited to the following embodiments, and various modifications can be made without changing the gist of the present invention.

Ferrite Powder

The ferrite powder according to the present embodiment is composed of highly spherical ferrite particles. In other words, the ferrite powder contains a large number of highly spherical ferrite particles. The ferrite powder containing highly spherical ferrite particles can result in superior formability and high filling properties when used as fillers into a resin composition (or ferrite resin composite material). Spherical particles effectively avoid the friction with other particles during shaping. This results in superior flowability during shaping and high filling ratio. In contrast, particles having anisotropic shapes (or irregular shapes), such as plate-like or needle-like particles, have inferior formability and low filling properties. In this specification, the term "irregularly shaped particles" encompasses particles having anisotropic shapes, and are used in contrast to particles having regular shapes, such as spherical particles.

The ferrite powder according to the present embodiment contains 55.0 to 70.0 mass % iron (Fe) and 3.5 to 18.5 mass % manganese (Mn). The ferrite powder has a composition of manganese (Mn)-based ferrite. A manganese (Mn)-based ferrite, which has significantly low iron (Fe) content or significantly high manganese (Mn) content, may cause low saturation magnetization (σs), high imaginary part of the complex magnetic permeability (µ"), and large loss factor (tan δ). Accordingly, the use of such ferrite powder in resin compositions may lead to a decrease in saturation magnetic flux density and an increase in loss. In contrast, a manganese (Mn)-based ferrite, which has significantly high iron (Fe) content or significantly low manganese (Mn) content, has a composition closer to magnetite ($FeO \cdot Fe_2O_3$). Magnetite contains instable divalent iron ions ($Fe^{2+}$), thus leading to a possible decrease in saturation magnetization (σs) due to oxidation. From these viewpoints, the contents of iron (Fe) and manganese (Mn) in the ferrite powder should be limited to the range described above. The ferrite powder may contain 57.0 to 70.0 mass % iron (Fe) and 4.5 to 15.0 mass % manganese (Mn), or 58.0 to 69.0 mass % iron (Fe) and 6.0 to 10.0 mass % manganese (Mn). The sum of iron (Fe) and manganese (Mn) should not exceed 73.0 mass %.

Ferrite is an oxide. Ferrite powder thus contains oxygen (O) in addition to iron (Fe) and manganese (Mn). Other elements than iron (Fe), manganese (Mn) and oxygen (O) may also be included as long as the above composition range is satisfied. Such elements include, for example, zinc (Zn), magnesium (Mg), strontium (Sr), titanium (Ti), lithium (Li), barium (Ba), yttrium (Y), nickel (Ni), copper (Cu), and cobalt (Co). However, from the viewpoint of fully exerting the properties of manganese (Mn)-based ferrite, the content of other elements should be preferably 1.0 mass % or less, more preferably 0.5 mass % or less. The ferrite powder may have a composition of iron (Fe), manganese (Mn) and oxygen (O) with the balance being incidental impurities. In this composition, incidental impurities refer to elements that are unavoidably mixed during a manufacturing process and are included in a content of 5,000 ppm or less. The incidental impurities include silicon (Si), aluminum (Al), calcium (Ca), chlorine (Cl), boron (B), zirconium (Zr), and chromium (Cr).

The ferrite powder according to the present embodiment contains $\alpha$-$Fe_2O_3$ (hematite) in a content of more than 0.0 mass % to 7.5 mass %. The inclusion of $\alpha$-$Fe_2O_3$ can prevent a decrease in electrical resistivity and withstand voltage while maintaining high magnetic properties of the ferrite powder. The reasons for the prevention are shown as follows: In the manufacture of ferrite, transition metal elements, such as iron (Fe) and manganese (Mn) as raw materials react with each other to form a ferrite component including a spinel phase, which is ferromagnetic material. The spinel phase is a complex oxide containing divalent metal ions and trivalent metal ions, such as manganese ferrite ($(Mn,Fe)O \cdot (Mn,Fe)_2O_3$) and magnetite ($FeO \cdot Fe_2O_3$). In this complex oxide, manganese (Mn) ions and iron (Fe) ions can be either divalent or trivalent. This ionic state causes electron hopping in the spinel phase, resulting in electrical conduction. As a result, ferrite consisting only of the spinel phase, in particular manganese (Mn)-based ferrite, tends to have low electrical resistivity.

In contrast, $\alpha$-$Fe_2O_3$ (hematite) is an isolated iron oxide derived from the iron element that is not contained in the spinel phase. The $\alpha$-$Fe_2O_3$ contains trivalent iron ions ($Fe^{3+}$) and no divalent iron ions ($Fe^{2+}$). The $\alpha$-$Fe_2O_3$ is thus a stable compound having high electrical resistivity. Accordingly, the inclusion of $\alpha$-$Fe_2O_3$ in highly spherical ferrite particles in the ferrite powder can block conductive pathways due to the spinel phase and cause high electrical resistivity and withstand voltage. From this viewpoint, the $\alpha$-$Fe_2O_3$ is an essential component, i.e., the content of $\alpha$-$Fe_2O_3$ in the powder is limited to more than 0.0 mass %. The content of $\alpha$-$Fe_2O_3$ may be 0.1 mass % or more, 0.5 mass % or more, 1.0 mass % or more, 2.0 mass % or more, 3.0 mass % or more, or 4.0 mass % or more. Different from the spinel phase, the $\alpha$-$Fe_2O_3$ is paramagnetic. A significantly high content of $\alpha$-$Fe_2O_3$ may thus reduce the magnetic properties (e.g., saturation magnetization or magnetic permeability) of the ferrite powder. The content of $\alpha$-$Fe_2O_3$ may be 7.0 mass % or less, or 6.0 mass % or less.

The ferrite powder (i.e., highly spherical ferrite particles) mainly contains the spinel phase in addition to the $\alpha$-$Fe_2O_3$. The content of spinel phase may be 80 mass % or more, 85 mass % or more, 90 mass % or more, or 95 mass % or more. The ferrite powder may also contain other phases than the spinel phase and $\alpha$-$Fe_2O_3$, and incidental impurities. Such other phases include, for example, excess manganese oxides (such as MnO, $Mn_2O_3$, and $Mn_3O_4$) and other iron oxides than spinel (such as $\gamma$-$Fe_2O_3$, FeO, and $Mn_3FeO_8$). However, the ferrite powder does not have to contain other phases. In other words, the ferrite powder may contain the spinel phase and $\alpha$-$Fe_2O_3$ with the balance being incidental impurities. The incidental impurities are elements having a content of 5,000 ppm or less as described above. In the ferrite powder according to the present embodiment, the highly spherical ferrite particles constituting the powder contains $\alpha$-$Fe_2O_3$. For example, the $\alpha$-$Fe_2O_3$ may be dispersed inside the highly spherical ferrite particles. Accordingly, such ferrite powder is distinguished from a mixture of ferrite particles free of $\alpha$-$Fe_2O_3$ and $\alpha$-$Fe_2O_3$.

The ferrite powder according to the present embodiment has a volume average particle size (D50) of 15.0 μm or less. If D50 exceeds 15.0 μm, the loss factor (tan δ) is too large and the withstand voltage is decreased. D50 may be 10.0 μm or less, or 7.0 μm or less. D50 has no specific lower limit. However, relatively high D50 results in the prevention of an increase in viscosity of the resin composition and an enhancement in the filling ratio of fillers. D50 may be 2.0 μm or more or 2.5 μm or more. The particle size distribution may have two or more peaks. The two or more peaks indicates that, when the volume particle size distribution is plotted as a function of the particle size expressed in a logarithmic scale, such a function has two or more points where the differential value (or differential coefficient value) or the value that is differentiated in two times or more for the function equals to 0 (such points are called maximum points, inflection points, or saddle points).

The ferrite powder preferably has a mean shape factor SF-1 of 100 to 110. The term "SF-1" is an index representing the sphericity of particle (or powder), SF-1 of 100 indicates a perfectly spherical shape, and SF-1 increases as the discrepancy from the spherical shape increases. SF-1 of 110 or less causes the powder to have higher flowability, and superior formability and filling ability. SF-1 may be 108 or less, 105 or less, or 103 or less.

The mean shape factor SF-1 of the ferrite powder is given by determining the shape factor SF-1 for each of the multiple ferrite particles and then calculating the mean value. The SF-1 of each ferrite particle is given by measuring the horizontal Feret diameter R (unit: μm), projected perimeter L (unit: μm), and projected area S (unit: μm$^2$) of each particle and substituting these measured values into the following formula (1).

[Expression 1]

$$SF - 1 = \frac{R^2}{S} \times \frac{\pi}{4} \times 100 \qquad (1)$$

The ferrite powder preferably has a BET specific surface area of 0.01 to 3.00 m$^2$/g. A BET specific surface area of 3.00 m$^2$/g or less can prevent the agglomeration of ferrite powder, resulting in superior formability and filling properties. In contrast, a BET specific surface area of 0.01 m$^2$/g or more can prevent the generation of interparticle voids, resulting in superior filling properties. In addition, the above range of the BET specific surface area causes high adhesion of the ferrite powder to the resin when used in a composite material or a composite article. The BET specific surface area may be 0.10 to 2.00 m$^2$/g.

The ferrite powder preferably has a tap density of 0.50 to 5.00 g/cm$^3$. The tap density can be increased by mixing of the particles having a small particle size with the particles having a large particle size, and this mixing consequently results in higher filling properties of the ferrite powder as a whole. The tap density may be 1.50 to 3.50 g/cm$^3$.

The ferrite powder preferably has a carbon (C) content of 0.12 mass % or less. This carbon is a component originated from a residual carbon (C) compound derived mainly from organic components (e.g., dispersants or binder resins) added in the production of ferrite powder. A significantly small content of organic components added in the production of ferrite powder causes instable supply of raw material to a step of thermally spraying, leading to readily containing of irregularly shaped particles into the ferrite powder. The irregularly shaped particles cause decreases in magnetic properties and filling properties. Accordingly, the ferrite powder preferably includes a certain content of carbon. The content of carbon (C) may be 0.001 mass % or more, 0.002 mass % or more, and 0.003 mass % or more. In contrast, a significantly large content of carbon (C) may hinder the curing of resins when the ferrite powder is used as fillers in the resin composition. Although the detailed mechanism is unknown, the residual carbon (C) compound derived from the organic components is a linear chain compound having no functional groups; hence, it is speculated that this carbon compound may react with the resins to adversely affect the curing of resins. The content of carbon may be 0.100 mass % or less, 0.080 mass % or less, 0.050 mass % or less, or 0.010 mass % or less.

The ferrite powder preferably contains one or more compounds selected from the group consisting of erucic acid amide ($C_{22}H_{43}N_0$), butyl palmitate ($C_{24}H_{40}O_2$) and butyl stearate ($C_{22}H_{44}O_2$) as the residual carbon (C) compounds. These compounds are mainly composed of components derived from organic components (e.g., dispersants or binder resins) added in the production of ferrite powder. No addition of organic components in the production of ferrite powder may result in a decrease in magnetic properties of ferrite powder and poor filling properties of the resin composition.

Since the ferrite powder according to the present embodiment contains $\alpha$-$Fe_2O_3$, it has high electrical resistivity. The volume resistivity of the ferrite powder may be $1.0 \times 10^8$ $\Omega \cdot cm$ or more, $2.0 \times 10^8$ $\Omega \cdot cm$ or more, or $4.0 \times 10^8$ $\Omega \cdot cm$ or more. The volume resistivity does not have a specific upper limit, although it is typically $1.0 \times 10^{10}$ $\Omega \cdot cm$ or less.

The ferrite powder can be used as fillers and kneaded with resins to yield resin compositions used in applications such as electromagnetic shielding materials. In these compositions, the resin, the ferrite powder containing $\alpha$-$Fe_2O_3$, and the ferrite powder free of $\alpha$-$Fe_2O_3$ have decreased electrical resistivities, in that order. In other words, the resin has the highest electrical resistivity, and the ferrite powder free of $\alpha$-$Fe_2O_3$ has the lowest electrical resistivity. A higher filling ratio of the ferrite powder in the resin composition shorten the distance between the ferrite particles and some of the ferrite particles come into contact with each other. Accordingly, the use of ferrite powder free of $\alpha$-$Fe_2O_3$, which has a low electrical resistivity, as fillers of the resin composition having high filling ratio, results in low withstand voltage. In this case, it is speculated that conductive pathways are formed between the ferrite particles having low electrical resistivity when a voltage is applied, resulting in the occurrence of breakdown (i.e., dielectric breakdown). Contrary to the configuration described above, the use of ferrite powder containing $\alpha$-$Fe_2O_3$, which has high electrical resistivity, as the fillers, can prevent such a decrease in withstand voltage.

In addition, the ferrite powder according to the present embodiment has a limited content of $\alpha$-$Fe_2O_3$ that is paramagnetic and a limited volume average particle size (D50); hence, a loss factor (tan $\delta$) can be kept low while maintaining high magnetic properties (e.g., saturation magnetization or magnetic permeability). Such limitations can improve the magnetic properties of the resin composition. The saturation magnetization ($\sigma s$) of the ferrite powder may be 65 emu/g or more, 70 emu/g or more, 75 emu/g or more, 80 emu/g or more, or 85 emu/g or more. The saturation magnetization ($\sigma s$) does not have a specific upper limit, although it is typically 95 emu/g or less. The tan $\delta$ of the ferrite powder at 100 MHz may also be 0.20 or less, 0.13 or less, or 0.06 or less. The tan $\delta$ does not have a specific lower limit, although it is typically 0.001 or more.

Process for Producing Ferrite Powder

A process for producing the ferrite powder according to the present embodiment comprises the following steps: mixing raw materials for ferrite to prepare a raw material mixture (step of mixing raw materials); calcining the resultant raw material mixture to form a calcined product (step of calcination); pulverizing and granulating the calcined product to prepare a granular product (step of granulation); and thermally spraying the granular product to produce a thermally sprayed product (step of thermally spraying). In this process, the granular product has a carbon content of 0.001 to 0.095 mass %, and the feed rate of the raw material is 2.5 to 9.0 kg/hour, the flow rate of combustible gas is 3 to 10 m³/hour, and the flow rate of oxygen is 18 to 60 m³/hour in the step of thermally spraying. The details of each step will now be described.

<Step of Mixing Raw Materials>

Ferrite raw materials are mixed to prepare a raw material mixture. Known ferrite raw materials, such as oxides, carbonates, hydroxides and/or chlorides, may be used. For example, iron (Fe) raw materials and manganese (Mn) raw materials, such as iron oxide ($Fe_2O_3$), trimanganese tetraoxide ($Mn_3O_4$) and/or manganese dioxide ($MnO_2$), can be employed. The mixing proportion of raw materials is determined such that ferrite powder has a desired composition. The raw materials may be mixed by either a dry or wet state or in combination of these states with a known mixer, such as a Henschel mixer. A mixture of raw materials may be granulated (or preliminarily granulated) with a granulator, such as a roller compactor.

<Step of Calcination>

In the calcination, the resulting raw material mixture is calcined to prepare a calcined product. The calcination may be performed by a known method. For example, a furnace, such as a rotary kiln, a continuous furnace or a batch furnace, may be used. The calcination may also be performed under any known condition. For example, the sample is held at 700 to 1300° C. for 0.5 to 12 hours in the ambient air.

<Step of Granulation>

In the granulation, the resulting calcined product is pulverized and then granulated (or full-fledgedly granulated) to prepare a granular product (or a full-fledged granular product). The pulverization may be performed by any process. For example, the pulverization may be performed in either a dry or wet state or in combination of these states with a known pulverizer, such as a vibration mill, a ball mill or a bead mill. The granulation may also be carried out by any known process. For example, water and optional additives, for example binder resins such as polyvinyl alcohol (PVA), dispersants, and/or antifoaming agents, are added to the pulverized calcined product to adjust the viscosity of the product, and the granulation is carried out with a granulator such as a spray dryer.

In the granulation, the contents of the binder resin and the additive is adjusted such that the carbon (C) content in the granular product is 0.001 to 0.095 mass %. The contents of $\alpha$-$Fe_2O_3$ and carbon (C) in the resulting ferrite powder, although they depend on conditions in the subsequent step of thermally spraying, can be controlled by the adjustment of carbon (C) content in the granular product. In other words, a larger carbon (C) content in the granular product tends to cause a larger carbon (C) content in the ferrite powder. In addition, a larger carbon (C) content tends to cause a smaller content of $\alpha$-$Fe_2O_3$ in the ferrite powder. This is caused by a mechanism where the atmosphere in the thermal spray becomes more reductive and thus a reaction for ferritizing the granular product tends to readily proceed. Accordingly, if the granular product contains a significantly large amount of carbon (C), the ferrite powder cannot contain $\alpha$-$Fe_2O_3$, which has an effect to prevent a decrease in electrical resistivity. The carbon (C) content in the granular product may be 0.0750 mass % or less, or 0.050 mass % or less. In contrast, if the granular product contains a significantly small amount of carbon (C), the ferrite powder has an excess amount of $\alpha$-$Fe_2O_3$, which may cause a reduction in magnetic properties. The carbon (C) content in the granular product may be 0.005 mass % or more, or 0.010 mass % or more.

<Step of Thermally Spraying>

In the thermal spray, the granular product is thermally sprayed. In the thermal spray, a mixed gas of combustible gas and oxygen is used as a gas source for combustible flame. The granular product, which is a raw material in the thermal spray, passes through the combustible flame at a high temperature. At that time, a reaction of ferritization occurs, and part of the granular product is melted into highly spherical ferrite particles. In the thermal spray, a mixed gas of combustible gas and oxygen (i.e., total oxygen) can be used as a gas source for combustible flame. The volume ratio of the combustible gas to oxygen (i.e., total oxygen) is preferably 1:3.5 to 1:10.0, more preferably 1:5 to 1:8.0. This rate can result in the efficient production of ferrite particles having a highly spherical shape. The combustible gas may include propane gas, propylene gas or acetylene gas, and propane gas is suitably used.

The feed rate of raw material, i.e., granular product, in the thermal spray should be 2.5 to 9.0 kg/hour. A higher feed rate (or larger supply amount) facilitates spinelization of the granular product and decreases the $\alpha\text{-Fe}_2\text{O}_3$ content in the ferrite powder. This is caused by an increase in amount of raw material in the flame due to the high feed rate and thus a decrease in a flame temperature. A lower flame temperature shortens the time until the particles are cooled after the thermal spray, and the generated divalent iron ions ($Fe^{2+}$) readily remain in the ferrite particles. In contrast, A lower feed rate (or smaller supply amount) facilitates formation of $\alpha\text{-Fe}_2\text{O}_3$. This is caused by a decrease in amount of raw material in the flame due to the low feed rate and thus an increase in a flame temperature in the flame, and consequently longer time until the particles are cooled after the thermal spray. As described above, the control of the feed rate can adjust the content of $\alpha\text{-Fe}_2\text{O}_3$ in the resultant ferrite powder. In addition, a significantly high feed rate promotes ready adhesion among the granular products to each other and precludes a sufficient ferritization reaction into the inside of the particles. As a result, highly spherical particles cannot be formed or the desired magnetic properties cannot be achieved in some cases. In contrast, a significantly low feed rate causes an increase in manufacturing costs. From these viewpoints, the present embodiment defines the feed rate of raw material in the thermal spray. The feed rate may be 4.0 to 8.0 kg/hour.

Oxygen employed in the thermal spray is also used for the purpose of transportation of the raw material to the flame in the thermal spray. The oxygen therefore functions as a combustible oxygen component directly used in the flame and a transport oxygen component used for supply of raw material and then burned after the transportation of the raw material to the central part of the thermally spraying region. The carbon content in the ferrite powder after the thermal spray can be controlled by the volume ratio of the combustible oxygen component to the transport oxygen component for supply of raw material. The total oxygen consists of the combustible oxygen component and the transport oxygen component for supply of raw material, and the volume ratio of the combustible oxygen component to the transport oxygen component for supply of raw material, i.e., (combustible oxygen component):(transport oxygen component), is preferably 95:5 to 80:20. A larger proportion (i.e., closer to 100) exceeding the above value of the combustible oxygen component results in a decrease in supply capacity of raw material, thereby the raw material may clog a supply pipe for raw material. A smaller proportion (i.e., less than 80) below the above value of combustible oxygen results in the expansive supply of raw material to the outside of the central zone of the flame having the highest temperature and an insufficient ferritization reaction in the inside of the particles, thereby the content of $\alpha\text{-Fe}_2\text{O}_3$ included in the ferrite powder may increase after the thermal spray. From the viewpoint of no more increase of the content of $\alpha\text{-Fe}_2\text{O}_3$ than necessary, the volume ratio of the combustible oxygen to the oxygen for supply of raw material is more preferably 95:5 to 85:15, further more preferably 95:5 to 87:13, most preferably 95:5 to 89:11.

Furthermore, the capacity of the combustible oxygen preferably has 0.85 times or more that required for complete combustion of the combustible gas. For example, in the use of propane gas as the combustible gas, the capacity of the combustible oxygen preferably has 4.25 times or more that of the propane gas. Such capacities of the combustible oxygen cause a drop in temperature of the flame of the thermal spray to be minimized even if more oxygen is supplied than the oxygen required for the combustible gas to completely burn, resulting in the prevention of generating more amount of $\alpha\text{-Fe}_2\text{O}_3$ than necessary.

A rate of the combustible gas is preferably 1.05 to 2.00. The term "rate of the combustible gas" indicates the rate of the volume of the net combustible gas ($Nm^3$/hour) used for combustion to the weight of supplied raw material (kg/hour), which is calculated in accordance with the following formula (2):

[Expression 2]

$$\text{(Rate of combustible gas)} = \frac{\left[\text{Volume of net combustible gas used for combustion}\left(\frac{Nm^3}{hour}\right)\right]}{\left[\text{Weight of supplied raw material}\left(\frac{kg}{hour}\right)\right]} \quad (2)$$

The volume of the net combustible gas ($Nm^3$/hour) used for combustion is calculated in accordance with the following formula (3) or the following formula (4):

[Expression 3]

$$\text{(Volume of net combustible gas for combustion)} = \quad (3)$$
$$\text{(Volume of supplied oxygen)}/5$$
$$[\text{where (volume of supplied combustible gas)} \times$$
$$5 - \text{(volume of supplied oxygen)} \geq 0]$$

[Expression 4]

$$\text{(Volume of net combustible gas for combustion)} = \quad (4)$$
$$\text{(Volume of supplied combustible gas)}$$
$$[\text{where (volume of supplied combustible gas)} \times$$
$$5 - \text{(volume of supplied oxygen)} < 0]$$

Particles ferritized by the thermal spray are rapidly cooled and then solidified in the ambient air, and the particles are recovered with a cyclone or a filter to yield a thermally sprayed product.

<Step of Classification>

The resultant thermally sprayed product may be classified as needed. In the classification, the particle size may be adjusted to a desired particle size by a known process, such as wind power classification (or airflow classification), mesh classification, and sieving classification. In addition, particles having a large particle size and particles having a small particle size may be separated and then recovered in one step by an airflow classification such as a cyclone. The ferrite powder can be prepared in such a procedure.

The present embodiment provides a ferrite powder having a composition and an amount of $\alpha\text{-Fe}_2O_3$ within predetermined ranges and a process for producing the ferrite powder. The ferrite powder has superior magnetic properties and high electrical resistivity. Accordingly, a high withstand voltage can be maintained even when the ferrite powder is used in a resin composition having a high filling ratio.

Ferrite Resin Composite Material

The ferrite powder according to the present embodiment can be used in a ferrite resin composite material (or resin composition). The ferrite resin composite material includes ferrite powder and resins. The use of the ferrite powder according to the present embodiment as fillers can achieve a composite material having superior magnetic properties and high withstand voltage even in high filling ratios of fillers.

Examples of the resins constituting the composite material include epoxy resins, urethane resins, acrylic resins, silicone resins, polyamide resins, polyimide resins, polyamide-imide resins, fluororesins, and combinations thereof. The silicone resins may be modified silicone resins modified with, for example, acrylic, urethane, epoxy and/or fluorine groups.

The proportion of the ferrite powder to the total solid content in the composite material is preferably 50 to 95 mass %, more preferably 80 to 95 mass %. The proportion of the resin to the total solid content in the composite material is preferably 5 to 50 mass %, more preferably 5 to 20 mass %. The above proportional range of the ferrite powder or the resin can result in superior dispersibility of the ferrite powder in the composite material, and high storage stability and formability of the composite material, thereby the composite articles (i.e., shaped articles) given through shaping the composite material have superior characteristics, such as mechanical strength and electromagnetic shielding properties.

The composite material may contain other components than ferrite powder and resins. Examples of such components include solvents, fillers (e.g., organic fillers or inorganic fillers), plasticizers, antioxidants, dispersants, colorants such as pigments, and thermally conductive particles.

Such a ferrite resin composite material can be applied to electromagnetic shielding materials, electronic materials or electronic components. The electromagnetic shielding materials, the electronic materials or the electronic components may be produced by shaping composite materials using known processes. Any process of shaping can be used, such as compression molding, extrusion molding, injection molding, blow molding, or calender molding. In addition, the process may include a procedure of forming a coating film of the composite material on a substrate.

EXAMPLES

The present invention will now be described in more detail with reference to the following Examples. However, the present invention should not be limited to the following Examples.

(1) Preparation of Ferrite Powder

Example 1

<Steps of Mixing of Raw Materials and Preliminary Granulation>

Iron oxide ($Fe_2O_3$) and manganese dioxide ($MnO_2$) as raw materials were weighed into a molar ratio of iron (Fe) to manganese (Mn), i.e., Fe:Mn, of 8:1 and were then mixed. A Henschel mixer was used for mixing. The resultant mixture was preliminarily granulated with a roller compactor to prepare a preliminary granular product.

<Step of Calcination>

A raw material mixture preliminarily granulated (i.e., preliminary granular product) was calcined to yield a calcined product. The calcination was carried out using a rotary kiln under the conditions of 900° C. for one hour in the ambient air.

<Step of Full-Fledged Granulation>

The resultant calcined product was pulverized and then granulated to prepare a granular product (or a full-fledged granular product). The resultant calcined product was roughly pulverized with a dry bead mill (including steel ball beads having a diameter of 3/16 inch) and finely pulverized with a wet bead mill (including zirconia beads having a diameter of 0.65 mm) after addition of water. The resultant slurry had a concentration of solid content of 50 mass %, and the particle size (or particle size in the slurry) of the pulverized powder was 2.367 μm. Poly(ammonium carboxylate) salt was added as a dispersant to the resultant slurry at a proportion where such a salt had a volume of 60 cc for 25 kg of solid content in the slurry to adjust the viscosity of the slurry, and the slurry was then granulated with a spray dryer. The resultant granular product had a volume average particle size of 51.04 μm and a carbon (C) content of 0.0511 mass %.

<Steps of Thermally Spraying and Classification>

The resultant granular product was thermally sprayed in the flame of combustible gas and rapidly cooled. In the thermal spray, the flow rate of propane gas to the flow rate of total oxygen had a ratio of 1:5.42, and the feed rate of raw material was 1.08 in terms of a rate of the combustible gas. The cooled particles were subsequently recovered with a cyclone provided downstream of the gas flow to yield a thermally sprayed product. Furthermore, coarse powder was removed from the resultant thermally sprayed product through a sieve, and fine powder was removed by airflow classification to prepare a ferrite powder. In the thermal spray described above, the ratio of the combustible oxygen component to the transport oxygen component for supply of raw material, i.e., (combustible oxygen component):(transport oxygen component), was 90.8:9.2. Table 1 shows the conditions for production of the ferrite powder.

Example 2

In the step of full-fledged granulation, poly(ammonium carboxylate) salt was added to the slurry at a proportion where such a salt had a volume of 60 cc for 25 kg of solid content in the slurry, and a 10 mass % aqueous solution of polyvinyl alcohol (PVA) was further added as a binder in a volume of 50 cc. A ferrite powder was prepared as in Example 1 except for the above conditions. The granular product prepared in the step of full-fledged granulation had a volume average particle size of 51.84 μm and a carbon (C) content of 0.0575 mass %.

Example 3

In the step of full-fledged granulation, poly(ammonium carboxylate) salt was added to the slurry at a proportion where such a salt had a volume of 10 cc for 25 kg of solid content in the slurry, and a 10 mass % aqueous solution of polyvinyl alcohol (PVA) was further added in a volume of 150 cc. A ferrite powder was prepared as in Example 1 except for the above conditions. The granular product prepared in the step of full-fledged granulation had a volume average particle size of 50.55 μm and a carbon (C) content of 0.0743 mass %.

Example 4

In the step of full-fledged granulation, poly(ammonium carboxylate) salt was added to the slurry at a proportion where such a salt had a volume of 10 cc for 25 kg of solid content in the slurry, and a 10 mass % aqueous solution of polyvinyl alcohol (PVA) was further added in a volume of 300 cc. A ferrite powder was prepared as in Example 1 except for the above conditions. The granular product prepared in the step of full-fledged granulation had a volume average particle size of 50.70 μm and a carbon (C) content of 0.0941 mass %.

Example 5 (Comparative)

In the step of full-fledged granulation, poly(ammonium carboxylate) salt was added to the slurry at a proportion where such a salt had a volume of 10 cc for 25 kg of solid content in the slurry, and a 10 mass % aqueous solution of polyvinyl alcohol (PVA) was further added in a volume of 600 cc. A ferrite powder was prepared as in Example 1 except for the above conditions. The granular product prepared in the step of full-fledged granulation had a volume average particle size of 51.59 μm and a carbon (C) content of 0.0988 mass %.

Example 6 (Comparative)

In the step of mixing of raw materials, the raw materials were weighed into a molar ratio of iron (Fe) to manganese (Mn) of 14:1 and were then mixed. In the step of full-fledged granulation, a 10 mass % aqueous solution of polyvinyl alcohol (PVA) was added in a volume of 30 cc without addition of a dispersant (i.e., poly(ammonium carboxylate) salt) to the slurry. The feed rate of raw materials in the step of thermally spraying was 2.0 kg/hour. A ferrite powder was prepared as in Example 1 except for the above conditions. The granular product prepared in the step of full-fledged granulation had a volume average particle size of 51.17 μm and a carbon (C) content of 0.0561 mass %.

Example 7

In the step of mixing of raw materials, the raw materials were weighed into a molar ratio of iron (Fe) to manganese (Mn) of 14:1 and were then mixed. In the step of full-fledged granulation, a 10 mass % aqueous solution of polyvinyl alcohol (PVA) was added in a volume of 300 cc without addition of a dispersant (i.e., poly(ammonium carboxylate) salt) to the slurry. A ferrite powder was prepared as in Example 1 except for the above conditions. The granular product prepared in the step of full-fledged granulation had a volume average particle size of 50.97 μm and a carbon (C) content of 0.0971 mass %.

Example 8

In the step of mixing of raw materials, the raw materials were weighed into a molar ratio of iron (Fe) to manganese (Mn) of 3:1 and were then mixed. In the step of full-fledged granulation, a 10 mass % aqueous solution of polyvinyl alcohol (PVA) was added in a volume of 30 cc without addition of a dispersant (i.e., poly(ammonium carboxylate) salt) to the slurry. A ferrite powder was prepared as in Example 1 except for the above conditions. The granular product prepared in the step of full-fledged granulation had a volume average particle size of 51.45 μm and a carbon (C) content of 0.0256 mass %.

Example 9 (Comparative)

In the step of mixing of raw materials, the raw materials were weighed into a molar ratio of iron (Fe) to manganese (Mn) of 2.5:1 and were then mixed. In the step of full-fledged granulation, poly(ammonium carboxylate) salt was added to the slurry at a proportion where such a salt had a volume of 10 cc for 25 kg of solid content in the slurry. A ferrite powder was prepared as in Example 1 except for the above conditions. The granular product prepared in the step of full-fledged granulation had a volume average particle size of 50.54 μm and a carbon (C) content of 0.0549 mass %.

Example 10 (Comparative)

In the step of mixing of raw materials, the raw materials were weighed into a molar ratio of iron (Fe) to manganese (Mn) of 2:1 and were then mixed. In the step of full-fledged granulation, poly(ammonium carboxylate) salt was added to the slurry at a proportion where such a salt had a volume of 10 cc for 25 kg of solid content in the slurry. A ferrite powder was prepared as in Example 1 except for the above conditions. The granular product prepared in the step of full-fledged granulation had a volume average particle size of 51.69 μm and a carbon (C) content of 0.0539 mass %.

Example 11 (Comparative)

In the step of mixing of raw materials, the raw materials were weighed into a molar ratio of iron (Fe) to manganese (Mn) of 1:0 and were then mixed. In the step of full-fledged granulation, poly(ammonium carboxylate) salt was added to the slurry at a proportion where such a salt had a volume of 10 cc for 25 kg of solid content in the slurry, and a 10 mass % aqueous solution of polyvinyl alcohol (PVA) was further added in a volume of 50 cc. A ferrite powder was prepared as in Example 1 except for the above conditions. The granular product prepared in the step of full-fledged granulation had a volume average particle size of 51.28 μm and a carbon (C) content of 0.0552 mass %.

Example 12 (Comparative)

In the step of full-fledged granulation, poly(ammonium carboxylate) salt was added to the slurry at a proportion where such a salt had a volume of 60 cc for 25 kg of solid content in the slurry, and a 10 mass % aqueous solution of polyvinyl alcohol (PVA) was further added in a volume of 50 cc. In the step of classification after the thermal spray, the sieve used for removing coarse powder was replaced with another one having a different mesh size, and fine powder was removed with a sieve. A ferrite powder was prepared as in Example 1 except for the above conditions. The granular product prepared in the step of full-fledged granulation had a volume average particle size of 51.84 μm and a carbon (C) content of 0.0575 mass %.

Example 13 (Comparative)

In the step of thermally spraying, particles were collected with a bag filter to yield a thermally sprayed product. In the step of classification, coarse powder was removed from the thermally sprayed product by airflow classification, and fine powder was not removed. A ferrite powder was prepared as in Example 12 except for the above conditions. The granular product prepared in the step of full-fledged granulation had a volume average particle size of 51.84 μm and a carbon (C) content of 0.0575 mass %.

Example 14

In the step of classification after the thermal spray, coarse powder and fine powder were removed from the thermally sprayed product by airflow classification. A ferrite powder was prepared as in Example 12 except for the above conditions. The granular product prepared in the step of full-fledged granulation had a volume average particle size of 51.84 μm and a carbon (C) content of 0.0575 mass %.

Example 15

In the step of classification after the thermal spray, the sieve used for removing coarse powder was replaced with another one having a different mesh size. A ferrite powder was prepared as in Example 12 except for the above conditions. The granular product prepared in the step of full-fledged granulation had a volume average particle size of 51.84 μm and a carbon (C) content of 0.0575 mass %.

(2) Evaluation of Ferrite Powders

The ferrite powders of Examples 1 to 15 were evaluated as illustrated below.

<Analysis of Components—Contents of Metal Elements>

The contents of metal elements in the ferrite powder were determined by chemical analysis (i.e., ICP). A ferrite powder sample (0.2 g) was weighed, 60 ml of pure water, 20 ml of 1N hydrochloric acid and 20 ml of 1N nitric acid were added to the sample, and the mixture was then heated until the sample was completely dissolved in an aqueous solution. The aqueous solution was placed in an ICP analyzer (Shimadzu Corporation, ICPS-10001V) to measure the contents of metal elements.

<Analysis of Components—Carbon Content>

The carbon content in the ferrite powder was measured by infrared absorption spectrometry. In detail, 1 g of ferrite powder was burned in an oxygen flow to convert the carbon contained in the ferrite powder into carbon dioxide. The infrared absorbance of carbon dioxide was measured with an infrared absorption detector (LECO Japan Corporation, Sulfur and Carbon Analyzer CS200), and the carbon content was calculated from the measured absorbance.

<Analysis of Components—Residual Carbon Compound>

The residual carbon compound in the ferrite powder was analyzed with a high-resolution mass spectrometer (GC/MS). In detail, 5 g of ferrite powder was weighed and placed in a beaker having an internal volume of 200 ml, and 500 ml of methyl ethyl ketone (MEK) was further placed, followed by ultrasonic treatment for five minutes to extract organic components accompanying with the ferrite powder. The extract-containing MEK solution was filtered, and the resulting filtrate was used as liquid for testing. Analytical conditions for the high-resolution mass spectrometer (GC/MS) are shown as follows:

Gas Chromatograph: Agilent Technologies Inc., 6890N
Mass spectrometer: Agilent Technologies Inc., 5973N
Column: Agilent Technologies Inc., DB-5MS (film thickness; 0.25 μm)
Thermal desorber: Parkin Elmer Inc., TurboMatrix 650ATD
Thermal profile: 50° C. (two minutes) to 280° C. (18 minutes)
Heating rate: 20° C./min
Flow rate of carrier gas: helium, 1 ml/min
Injection mode: splitless, 0.5 minutes
Temperature at inlet: 280° C.
Temperature at interface: 280° C.
Measured mass range: m/z 29-600
Injection volume: 1 μl The carbon compound was identified based on the analytical results. The identification was performed as follows:

With an analyzer (Agilent Technologies Inc., 5973N), Detection peaks derived from the device and MEK were eliminated on a TIC chromatogram, and a library search was performed for each of the remaining detected peaks. The compound having the highest library consistency in the mass spectral pattern was identified as the residual carbon compound in the ferrite powder.

<Crystalline Phase>

The ferrite powder was analyzed by X-ray diffractometry to identify the crystalline phases in the powder. The contents of the spinel phase (e.g., $Fe_3O_4$ or $MnO \cdot Fe_2O_3$) and the $\alpha$-$Fe_2O_3$ phase were determined in all the crystalline phases. Analytical conditions are shown as follows:

X-ray diffractometer: Malvern Panalytical Ltd., X'pert MPD (including a high-rate detector)
Radioactive source: Co—K$\alpha$
Tube voltage: 45 kV
Tube current: 40 mA
Scanning rate: 0.002 degrees/sec (continuous scan)
Scanning range (2θ): 15-90 degrees The observed results were further analyzed to determine the contents of the spinel phase (e.g., $Fe_3O_4$ or $MnO \cdot Fe_2O_3$) and the $\alpha$-$Fe_2O_3$ phase in all the crystalline phases of the ferrite powder. The analysis was performed as follows:

The background peaks and Co—K$\beta$ ray peaks are removed using analytical software (Malvern Panalytical Ltd., HighScore Plus 3.0), and characteristic peaks were then automatically analyzed. The half width and position for each detected peak were optimized (refined) by Rietveld analysis, and the contents of the spinel phase and $\alpha$-$Fe_2O_3$ phase were calculated based on the optimized results.

<Particle Size Distribution>

The particle size distribution of the ferrite powder was measured. Into a 100-ml beaker was placed 10 g sample and 80 ml water, and two drops of sodium hexametaphosphate was added as a dispersant. The mixture was then dispersed with an ultrasonic homogenizer (SMT Co., Ltd., UH-150). The dispersion was performed for 20 seconds at an output level of 4 of the ultrasonic homogenizer. The bubbles formed on the surface of beaker were then removed and the dispersion was introduced into a laser diffraction particle size distribution analyzer (Shimadzu Corporation, SALD-7500 nano) for measurement. In this measurement, 10% diameter (D10), 50% diameter (volume average particle diameter, D50), 90% diameter (D90) and maximum diameter (Dmax) were determined from the volume particle size distribution. The measuring conditions included a pump rate of 7, a built-in ultrasonic irradiation time of 30, and a refractive index of 1.70-050i.

<BET Specific Surface Area>

The BET specific surface area of the ferrite powder was measured with a specific surface area analyzer (Mountech Co., Ltd., Macsorb HM model-1208). Approximately 10 g of the resulting ferrite powder was placed on medicine wrapping paper and degassed with a vacuum dryer until the degree of vacuum reached −0.1 MPa or less. The powder was then heated at 200° C. for two hours to remove the water adsorbed on the particle surface. Approximately 0.5 to 4 g of the ferrite powder after removing water was placed in a standard sample cell dedicated to the analyzer and correctly weighed with a precision balance. The weighed ferrite particles were placed in the sample port of the analyzer and then measured. The measurement was carried out by a one-point method. The atmosphere for measurement includes a temperature of 10 to 30° C. and a relative humidity of 20 to 80% (without dewing).

<Tap Density>

The tap density of the ferrite powder was measured in accordance with JIS Z 2512-2012 with a USP tap density analyzer (Hosokawa Micron Corporation, Powder Tester PT-X).

<Shape Factor (SF-1)>

The mean shape factor (SF-1) of the ferrite powder was determined as follows: Ferrite powder was analyzed using a particle image analyzer (Malvern Panalytical Ltd., Morphologi G3). Image analysis was carried out for all the 30,000 particles in the powder, and the maximum length (i.e., horizontal Feret diameter) R (unit: μm), projected perimeter L (unit: μm), and projected area S (unit: μm²) were automatically measured. SF-1 for each particle was then calculated in accordance with the following formula (1), and the mean value thereof was used as SF-1 of the ferrite powder.

[Expression 5]

$$SF - 1 = \frac{R^2}{S} \times \frac{\pi}{4} \times 100 \quad (1)$$

<Magnetic Properties—Saturation Magnetization, Remanent Magnetization, and Coercivity>

The magnetic properties (saturation magnetization, remanent magnetization, and coercivity) of the ferrite powder were measured as follows: A sample was packed in a cell having an inner diameter of 5 mm and a height of 2 mm and placed in a vibrating sample magnetometer (Toei Industry Co., Ltd., VSM-C7-10A). A magnetic field was applied and swept up to 5 kOe, and the applied magnetic field was then reduced to draw a hysteresis curve. From the data in this curve, the saturation magnetization σs, the remanent magnetization σr, and the coercivity Hc of the sample were determined <Magnetic Properties—Permeability>

The permeability of the ferrite powder was measured with an RF impedance/material analyzer (Agilent Technologies Inc., E4991A) and a magnetic material measuring electrode (16454A). Into a polyethylene container (content capacity: 100 ml) was placed 9 g of the ferrite powder and 1 g of a binder resin (Kynar301F: polyvinylidene difluoride), and the mixture was stirred with a ball mill under conditions including a rotation rate of 100 rpm. The resultant mixture (about 0.6 g) was transferred into a die (inner diameter: 4.5 mm, outer diameter: 13 mm) and pressed at a pressure of 40 MPa for one minute with a pressing machine to yield a shaped article. The resultant shaped article was heat-cured at 140° C. for two hours with a hot air dryer to prepare a sample for measurement. The resultant sample was placed in the RF impedance/material analyzer, and the outer diameter, inner diameter and height of the sample preliminarily measured were input. In the measurement, the amplitude was set to 100 mV, and the frequency range of 1 MHz to 3 GHz was swept on a logarithmic scale. The real part (μ') and the imaginary part (μ") of the complex magnetic permeability at a frequency of 100 MHz were determined, and the loss factor (tan δ) was calculated in accordance with the following formula (5):

[Expression 6]

$$\tan\delta = \frac{\mu''}{\mu'} \quad (5)$$

<Electrical Properties—Volume Resistivity>

The volume resistivity of the ferrite powder was measured using a Teflon™ container (inner diameter: 17.6 mm) having an electrode on its bottom and an upper electrode. The ferrite powder was placed into the container and then pressed such that the height during the measurement was 4 mm, and the upper electrode was attached to the top of the pressed powder. The measurement was carried out under a load of 1 kg applied on the upper electrode, and the flowing current was determined with an electrometer (Keithley Instruments Inc., 6517A) while increasing the voltage up to 1000 V stepwise at five second intervals in an increment of 50 V. The relation between the current flowing at a voltage of 100 V and the applied voltage was determined, and the volume resistivity was then calculated from this relation.

<Electrical Properties—Breakdown Voltage>

In the measurement of volume resistivity, the applied voltage immediately before the output current from the instrument (i.e., electrometer) exceeds 20 mA was determined, and this applied voltage was defined as a breakdown voltage (VBD).

<Curing Properties of Resin—Viscosity>

The ferrite powder was used in a resin composition, and the viscosity of the resin composition was measured. Ferrite powder (70 parts by mass), a main agent (i.e., epoxy resin) (27 parts by mass) and a curing agent (3 parts by mass) were thoroughly dispersed in a planetary centrifugal mixer to prepare a resin composition. The viscosity immediately after production and the viscosity at five seconds after production of the resultant resin composition were measured using a B-type viscometer. Since the ferrite powder of Example 5 had a low volume resistivity, curing properties of resin thereof were not evaluated.

<Curing Properties of Resin—Curing Time>

The resultant resin composition was dried under conditions of 120° C. for five minutes. The dried resin composition was heated at 180° C. to promote curing, and the curing time was determined at which the degree of curing of the resin was 95% or more. The curing properties of resin were ranked as follows based on the resultant curing time.

A: Curing time is std×1.00 or more to less than std×2.00
B: Curing time is std×2.00 or more to less than std×3.00

In this ranking, the degree of curing of resin indicates the degree in progress of the curing reaction (i.e., reaction rate) of the resin. The degree of curing of resin is 0% in an unreacted material while the degree of curing of resin is 100% in a reacted material. The degree of curing of resin was determined by FT-IR (Fourier-transform infrared spectroscopy) device. Specifically, the resin was irradiated with infrared rays to give an FT-IR spectrum by transmission and diffraction, and the progress of the curing reaction of the resin was determined from this spectrum. The spectra of the unreacted material and the completely (100%) reacted material were compared with the spectrum of the target resin, and the peak intensity of each sample in the region where the largest difference was observed was compared to determine the degree of curing of the resin. The curing time of each sample was calculated based on the curing time of the ferrite powder of Example 1 as a standard (or std).

(3) Results

The results of evaluation given for Examples 1 to 15 are shown in Tables 2 and 3. Examples 1 to 4, Example 7, Example 8, Examples 14 and 15 show inventive samples, and Examples 5, 6 and 9 to 13 show comparative samples.

As illustrated in Tables 2 and 3, the ferrite powder in each sample was composed of highly spherical particles. However, in Example 5, which is a comparative example, the ferrite powder did not contain $\alpha$-$Fe_2O_3$ and consequently has low volume resistivity and low breakdown voltage, leading to a problem in terms of withstand voltage.

In contrast, in Examples 6, 11 and 13, which are comparative examples, the ferrite powders contain excess amounts of $\alpha$-$Fe_2O_3$, resulting in low saturation magnetization ($\sigma$s). In addition, the ferrite powder of Example 13 had a small volume average particle size, resulting in significantly high viscosity of the resin composition and inferior curing properties of resin. In Examples 9 to 11, which are comparative examples, the contents of iron (Fe) and/or manganese (Mn) in the ferrite powder are located outside the range of the present embodiment, leading to problems in terms of magnetic properties (e.g., saturation magnetization, permeability, or loss factor). In particular, in Example 11 where manganese (Mn) was barely contained although the amount of $\alpha$-$Fe_2O_3$ was excessive, the ferrite powder had low saturation magnetization ($\sigma$s) and high coercivity (Hc), resulting in a decrease in real part of the complex magnetic permeability ($\mu'$) and an increase in loss factor (tan $\delta$). In Example 12, which is a comparative example, the ferrite powder had a significantly large volume average particle diameter (D50), leading to high loss factor (tan $\delta$) and low breakdown voltage.

In contrast, the ferrite powders of Examples 1 to 4, Example 7, Example 8, Example 14, and Example 15 had superior magnetic properties (e.g., saturation magnetization, coercivity, magnetic permeability, or loss factor), and had high volume resistivity and high withstand voltage (or breakdown voltage). In particular, the powders of Examples 1 to 3, Example 8 and Example 14 did not generate the breakdown when measured and were remarkably superior in terms of withstand voltage. In addition, the resin compositions containing each of the powders of Examples 1 to 4, Example 7, Example 8 and Example 15 had low viscosities. In conclusion, these powders are suitable for fillers in resin compositions having a high filling ratio.

TABLE 1

Conditions for production of ferrite powders and properties of granular products

| | Mixing of raw materials | | Full-fledged granulation | | | | properties of granular product | |
|---|---|---|---|---|---|---|---|---|
| | Fe (mol) | Mn (mol) | particle size in slurry (m) | Concentration of slurry (mass %) | Amount of dispersant (cc) | Amount of binder (cc) | Carbon content (mass %) | D50 (μm) |
| Example 1 | 8 | 1 | 2.367 | 50 | 60 | 0 | 0.0511 | 51.04 |
| Example 2 | 8 | 1 | 2.653 | 50 | 60 | 50 | 0.0575 | 51.84 |
| Example 3 | 8 | 1 | 3.191 | 50 | 10 | 150 | 0.0743 | 50.55 |
| Example 4 | 8 | 1 | 3.041 | 50 | 10 | 300 | 0.0941 | 50.70 |
| Example 5* | 8 | 1 | 2.521 | 50 | 10 | 600 | 0.0988 | 51.59 |
| Example 6* | 14 | 1 | 2.008 | 50 | 0 | 30 | 0.0561 | 51.17 |
| Example 7 | 14 | 1 | 2.008 | 50 | 0 | 300 | 0.0971 | 50.97 |
| Example 8 | 3 | 1 | 2.517 | 50 | 0 | 30 | 0.0256 | 51.45 |
| Example 9* | 2.5 | 1 | 1.765 | 50 | 10 | 0 | 0.0549 | 50.54 |
| Example 10* | 2 | 1 | 1.739 | 50 | 10 | 0 | 0.0539 | 51.69 |
| Example 11* | 1 | 0 | 0.327 | 50 | 10 | 50 | 0.0552 | 51.28 |
| Example 12* | 8 | 1 | 2.653 | 50 | 60 | 50 | 0.0575 | 51.84 |
| Example 13* | 8 | 1 | 2.653 | 50 | 60 | 50 | 0.0575 | 51.84 |

TABLE 1-continued

Conditions for production of ferrite powders and properties of granular products

| | | | | | | | | |
|---|---|---|---|---|---|---|---|---|
| Example 14 | 8 | 1 | 2.653 | 50 | 60 | 50 | 0.0575 | 51.84 |
| Example 15 | 8 | 1 | 2.653 | 50 | 60 | 50 | 0.0575 | 51.84 |

| | Thermal spray | | | | classification | |
|---|---|---|---|---|---|---|
| | Volume of propane (m³/hr) | Volume of oxygen (m³/hr) | Feed rate of raw material (kg/hr) | Recovery | Coarse | Fine |
| Example 1 | 7 | 38 | 6.5 | Cyclone | Sieve | Airflow |
| Example 2 | 7 | 38 | 6.5 | Cyclone | Sieve | Airflow |
| Example 3 | 7 | 38 | 6.5 | Cyclone | Sieve | Airflow |
| Example 4 | 7 | 38 | 6.5 | Cyclone | Sieve | Airflow |
| Example 5* | 7 | 38 | 6.5 | Cyclone | Sieve | Airflow |
| Example 6* | 7 | 38 | 2.0 | Cyclone | Sieve | Airflow |
| Example 7 | 7 | 38 | 6.5 | Cyclone | Sieve | Airflow |
| Example 8 | 7 | 38 | 6.5 | Cyclone | Sieve | Airflow |
| Example 9* | 7 | 38 | 6.5 | Cyclone | Sieve | Airflow |
| Example 10* | 7 | 38 | 6.5 | Cyclone | Sieve | Airflow |
| Example 11* | 7 | 38 | 6.5 | Cyclone | Sieve | Airflow |
| Example 12* | 7 | 38 | 6.5 | Cyclone | Sieve | Sieve |
| Example 13* | 7 | 38 | 6.5 | Bag filter | Airflow | None |
| Example 14 | 7 | 38 | 6.5 | Bag filter | Airflow | Airflow |
| Example 15 | 7 | 38 | 6.5 | Cyclone | Sieve | Sieve |

Note 1)
*indicates comparative example.

TABLE 2

Results of evaluation of ferrite powders

| | Ferrite powder | | | | | |
|---|---|---|---|---|---|---|
| | Analysis of components | | | | XRD | |
| | Fe (mass %) | Mn (mass %) | Carbon (mass %) | Residual Carbon compound | Spinel phase (mass %) | $\alpha\text{-Fe}_2\text{O}_3$ (mass %) |
| Example 1 | 63.53 | 7.78 | 0.00224 | EA | 95.5 | 4.5 |
| Example 2 | 61.80 | 7.38 | 0.00251 | EA, PB, SB | 96.3 | 3.7 |
| Example 3 | 63.45 | 8.05 | 0.00381 | EA, PB, SB | 97.2 | 2.8 |
| Example 4 | 63.07 | 8.03 | 0.00565 | EA, PB, SB | 98.9 | 1.1 |
| Example 5* | 63.52 | 7.86 | 0.01120 | EA, PB, SB | 100.0 | 0.0 |
| Example 6* | 66.20 | 5.33 | 0.00258 | EA, PB, SB | 85.7 | 14.3 |
| Example 7 | 66.31 | 5.28 | 0.00458 | EA, PB, SB | 85.7 | 6.9 |
| Example 8 | 57.05 | 13.73 | 0.00259 | EA, PB, SB | 98.4 | 1.6 |
| Example 9* | 51.73 | 18.00 | 0.00230 | EA | 96.3 | 3.7 |

TABLE 2-continued

| | Results of evaluation of ferrite powders | | | | | |
|---|---|---|---|---|---|---|
| Example 10* | 48.18 | 20.77 | 0.00321 | EA | 96.5 | 3.5 |
| Example 11* | 70.00 | 0.01 | 0.00276 | EA, PB, SB | 76.4 | 23.5 |
| Example 12* | 63.41 | 7.82 | 0.00244 | EA, PB, SB | 98.7 | 1.3 |
| Example 13* | 62.65 | 8.27 | 0.01814 | EA, PB, SB | 92.1 | 7.9 |
| Example 14 | 62.38 | 8.10 | 0.00721 | EA, PB, SB | 94.1 | 5.9 |
| Example 15 | 63.22 | 7.95 | 0.00231 | EA, PB, SB | 98.3 | 1.5 |

| | Ferrite powder | | | | | | | |
|---|---|---|---|---|---|---|---|---|
| | Volume particle size distribution | | | | | Tap density | Particle shape | |
| | D10 (μm) | D50 (μm) | D90 (μm) | Dmax (μm) | BET (m²/g) | (g/cm³) | Shape | SF-1 |
| Example 1 | 1.96 | 4.06 | 9.08 | 21.63 | 0.62 | 2.78 | Highly spherical | 101 |
| Example 2 | 1.62 | 3.73 | 9.86 | 27.31 | 0.70 | 2.89 | Highly spherical | 101 |
| Example 3 | 1.71 | 3.52 | 8.81 | 21.63 | 0.68 | 2.69 | Highly spherical | 102 |
| Example 4 | 1.57 | 3.34 | 8.55 | 21.63 | 0.64 | 2.59 | Highly spherical | 102 |
| Example 5* | 1.74 | 3.29 | 8.78 | 21.63 | 0.61 | 2.86 | Highly spherical | 102 |
| Example 6* | 1.66 | 3.78 | 9.18 | 27.31 | 0.53 | 3.00 | Highly spherical | 102 |
| Example 7 | 1.64 | 3.57 | 8.98 | 21.63 | 0.55 | 3.03 | Highly spherical | 102 |
| Example 8 | 1.89 | 3.94 | 9.28 | 21.63 | 0.62 | 2.95 | Highly spherical | 101 |
| Example 9* | 1.73 | 3.46 | 8.81 | 21.63 | 0.59 | 2.87 | Highly spherical | 101 |
| Example 10* | 1.70 | 3.23 | 8.21 | 21.63 | 0.63 | 2.88 | Highly spherical | 101 |
| Example 11* | 1.61 | 3.82 | 9.45 | 27.31 | 0.61 | 2.96 | Highly spherical | 101 |
| Example 12* | 12.52 | 21.42 | 33.62 | 54.92 | 0.25 | 3.57 | Highly spherical | 101 |
| Example 13* | 0.10 | 0.50 | 1.60 | 5.35 | 4.70 | 1.19 | Highly spherical | 102 |
| Example 14 | 0.51 | 0.99 | 1.77 | 5.35 | 1.89 | 1.77 | Highly spherical | 101 |
| Example 15 | 1.91 | 10.04 | 24.26 | 54.92 | 0.41 | 3.48 | Highly spherical | 101 |

Note 1)
*indicates comparative example.
Note 2)
EA: erucic acid amide,
PB: butyl palmitate,
SB: butyl stearate

TABLE 3

| | Results of evaluation of ferrite powders and resin compositions | | | | | | | | | | |
|---|---|---|---|---|---|---|---|---|---|---|---|
| | Ferrite powder | | | | | | | | Resin composition | | |
| | Magnetic properties (VSM, 5 kOe) | | | Permeability (100 MHz) | | | Volume resistivity | Breakdown voltage | Viscosity | | Curing properties of resin |
| | σs (emu/g) | σr (emu/g) | Hc (Oe) | μ' | μ'' | tanδ | (Ω·cm) | (V) | Initial | After 5 seconds | Curing time | Rank |
| Example 1 | 82.24 | 2.83 | 41.57 | 6.56 | 0.18 | 0.03 | $4.5 \times 10^8$ | No breakdown | 60000 | 50000 | std | A |
| Example 2 | 83.00 | 3.28 | 46.88 | 6.50 | 0.34 | 0.05 | $3.3 \times 10^8$ | No breakdown | 75000 | 60000 | std | A |

TABLE 3-continued

Results of evaluation of ferrite powders and resin compositions

| | Ferrite powder | | | | | | | | Resin composition | | | |
|---|---|---|---|---|---|---|---|---|---|---|---|---|
| | Magnetic properties (VSM, 5 kOe) | | | Permeability (100 MHz) | | | Volume resistivity | Breakdown voltage | Viscosity | | Curing properties of resin | |
| | σs (emu/g) | σr (emu/g) | Hc (Oe) | μ' | μ" | tanδ | (Ω·cm) | (V) | Initial | After 5 seconds | Curing time | Rank |
| Example 3 | 80.80 | 2.95 | 43.00 | 6.90 | 0.39 | 0.06 | $2.1 \times 10^8$ | No breakdown | 70000 | 55000 | std × 1.15 | A |
| Example 4 | 80.84 | 2.66 | 39.12 | 6.90 | 0.35 | 0.05 | $1.3 \times 10^8$ | 900 | 65000 | 55000 | std × 1.50 | A |
| Example 5* | 81.77 | 2.76 | 40.71 | 6.89 | 0.32 | 0.05 | $7.9 \times 10^7$ | 450 | Not evaluated for resin composition. | | | |
| Example 6* | 69.28 | 3.26 | 53.11 | 4.89 | 0.03 | 0.01 | $7.5 \times 10^8$ | No breakdown | 50000 | 40000 | std | A |
| Example 7 | 81.08 | 2.76 | 41.21 | 6.18 | 0.05 | 0.01 | $4.1 \times 10^8$ | 800 | 50000 | 40000 | std × 1.20 | A |
| Example 8 | 81.80 | 2.27 | 32.46 | 8.13 | 1.01 | 0.12 | $1.8 \times 10^8$ | No breakdown | 60000 | 50000 | std | A |
| Example 9* | 78.26 | 2.07 | 30.06 | 8.26 | 1.16 | 0.14 | $1.5 \times 10^8$ | No breakdown | 60000 | 50000 | std | A |
| Example 10* | 74.09 | 2.04 | 29.35 | 7.96 | 1.22 | 0.15 | $1.2 \times 10^8$ | No breakdown | 65000 | 55000 | std × 1.10 | A |
| Example 11* | 61.40 | 4.40 | 94.30 | 1.65 | 0.03 | 0.21 | $5.9 \times 10^8$ | No breakdown | 65000 | 50000 | std × 1.10 | A |
| Example 12* | 87.84 | 2.91 | 39.76 | 6.73 | 0.87 | 0.13 | $1.8 \times 10^8$ | 650 | 20000 | 16000 | std × 1.10 | A |
| Example 13* | 77.50 | 5.37 | 62.31 | 8.94 | 0.40 | 0.04 | $6.8 \times 10^8$ | No breakdown | 120000 | 100000 | std × 2.10 | B |
| Example 14 | 79.47 | 2.86 | 42.17 | 6.29 | 0.18 | 0.03 | $5.6 \times 10^8$ | No breakdown | 100000 | 75000 | std × 1.35 | A |
| Example 15 | 87.52 | 2.76 | 39.50 | 7.26 | 0.87 | 0.12 | $1.8 \times 10^8$ | 700 | 40000 | 30000 | std × 1.80 | A |

Note 1)
*indicates comparative example.

The invention claimed is:

1. A ferrite powder comprising highly spherical ferrite particles,
   wherein the ferrite powder contains 55.0 to 70.0 mass % iron (Fe) and 3.5 to 18.5 mass % manganese (Mn), the ferrite powder containing more than 0.0 mass % to 7.5 mass % α-$Fe_2O_3$,
   wherein the ferrite powder has a volume average particle size (D50) of 15.0 μm or less,
   wherein the content of elements other than iron (Fe), manganese (Mn), and oxygen (O) in the ferrite powder is 0.5 mass % or less, and
   wherein the ferrite powder has a carbon (C) content of from 0.001 mass % to 0.12 mass %.

2. The ferrite powder according to claim 1, wherein the α-$Fe_2O_3$ is contained in the ferrite powder in an amount of 3.0 mass % to 6.0 mass %.

3. The ferrite powder according to claim 1, wherein the ferrite powder has a volume average particle size (D50) of 2.0 μm to 15 μm.

4. The ferrite powder according to claim 1, wherein the ferrite powder has a mean shape factor SF-1 of 100 to 110.

5. The ferrite powder according to claim 1, wherein the ferrite powder has a volume resistivity of $1.0 \times 10^8$ Ω·cm or more.

6. The ferrite powder according to claim 1, wherein the ferrite powder contains 58.0 to 69.0 mass % iron (Fe) and 6.0 to 10.0 mass % manganese (Mn).

7. The ferrite powder according to claim 1, wherein the ferrite powder has a volume average particle size (D50) of 2.5 to 7.0 μm.

8. The ferrite powder according to claim 1, wherein the ferrite powder comprises one or more compounds selected from the group consisting of erucic acid amide ($C_{22}H_{43}NO$), butyl palmitate ($C_{20}H_{40}O_2$) and butyl stearate ($C_{22}H_{44}O_2$).

9. The ferrite powder according to claim 1, wherein the α-$Fe_2O_3$ is dispersed inside the highly spherical ferrite particles.

10. A process for producing the ferrite powder according to claim 1, comprising the steps of:
   mixing raw materials for ferrite to prepare a raw material mixture;
   calcining the raw material mixture to form a calcined product;
   pulverizing and granulating the calcined product to prepare a granular product; and
   thermally spraying the granular product to produce a thermally sprayed product;
   wherein the granular product has a carbon content of 0.001 to 0.095 mass %, and the feed rate of a raw material is 2.5 to 9.0 kg/hour, the flow rate of combustible gas is 3 to 10 $m^3$/hour, and the flow rate of oxygen is 18 to 60 $m^3$/hour in the step of thermally spraying.

* * * * *